(12) United States Patent
Jee

(10) Patent No.: US 11,097,794 B2
(45) Date of Patent: Aug. 24, 2021

(54) ROLLER SUSPENSION SYSTEM

(71) Applicant: SRJ, Inc., Schaumburg, IL (US)

(72) Inventor: Woo Young Jee, Inverness, IL (US)

(73) Assignee: SRJ, Inc., Schaumburg, IL (US)

( * ) Notice: Subject to any disclaimer, the term of this patent is extended or adjusted under 35 U.S.C. 154(b) by 262 days.

(21) Appl. No.: 16/276,104

(22) Filed: Feb. 14, 2019

(65) Prior Publication Data
US 2020/0262499 A1    Aug. 20, 2020

(51) Int. Cl.
*B62D 55/108* (2006.01)
*B62D 55/15* (2006.01)
*B62D 55/14* (2006.01)
*B62D 55/06* (2006.01)

(52) U.S. Cl.
CPC ........... *B62D 55/108* (2013.01); *B62D 55/06* (2013.01); *B62D 55/14* (2013.01); *B62D 55/15* (2013.01)

(58) Field of Classification Search
CPC ....... B62D 55/108; B62D 55/14; B62D 55/15
See application file for complete search history.

(56) References Cited

U.S. PATENT DOCUMENTS

| | | | |
|---|---|---|---|
| 1,443,556 A * | 1/1923 | Beal | B62D 55/108 305/132 |
| 1,450,466 A * | 4/1923 | Turnball | B62D 55/108 280/28.5 |
| 1,568,241 A | 1/1926 | Rimailho | |
| 1,836,446 A | 12/1931 | Christie | |
| 2,487,134 A * | 11/1949 | Herold | B62D 55/108 305/133 |
| 3,019,061 A | 1/1962 | Schomers | |
| 3,093,006 A | 6/1963 | Gamaunt | |
| 3,157,394 A | 11/1964 | Kelley | |
| 3,275,387 A | 9/1966 | Hedges | |
| 3,606,376 A | 9/1971 | Hickman | |
| 3,840,082 A | 10/1974 | Olson | |
| 4,501,452 A | 2/1985 | Huang | |
| 4,519,654 A | 5/1985 | Satzler et al. | |
| 5,409,075 A | 4/1995 | Nieman | |
| 5,851,058 A | 12/1998 | Humbek et al. | |
| 6,892,838 B2 | 5/2005 | Bowers | |

(Continued)

FOREIGN PATENT DOCUMENTS

| | | |
|---|---|---|
| GB | 238236 A | 3/1926 |
| KR | 20010064823 A | 7/2001 |

(Continued)

OTHER PUBLICATIONS

International Search Report and Written Opinion of International Application No. PCT/US2020/017719, dated Jun. 18, 2020, 11 pp.

*Primary Examiner* — Kevin Hurley
(74) *Attorney, Agent, or Firm* — Shumaker & Sieffert, P.A.

(57) ABSTRACT

A suspension system for a tracked vehicle includes a track roller configured to contact and roll relative to an inner surface of a track. In some examples, the track roller includes an axle member, a roller mounting bracket mechanically connected to the axle member, a frame mounting bracket configured to attach to a frame of the tracked vehicle, and a plurality of coil springs disposed between the roller mounting bracket and the frame mounting bracket. The plurality of coil springs is configured to reduce an impact force transferred from the track roller to the frame of the tracked vehicle.

20 Claims, 6 Drawing Sheets

(56) References Cited

U.S. PATENT DOCUMENTS

| | | | |
|---|---|---|---|
| 6,904,986 B2 | 6/2005 | Brazier | |
| 7,552,785 B2 | 6/2009 | Tuhy | |
| 7,624,827 B2 * | 12/2009 | Moser | B62D 55/108 180/9.32 |
| 7,708,092 B2 | 5/2010 | Despres | |
| 2001/0001431 A1 | 5/2001 | Lemke et al. | |
| 2001/0030068 A1 | 10/2001 | Nagorkca et al. | |
| 2008/0105472 A1 | 5/2008 | Tuhy | |
| 2017/0361884 A1 | 12/2017 | Jee | |

FOREIGN PATENT DOCUMENTS

| | | | |
|---|---|---|---|
| KR | 100349104 B1 * | 8/2002 | |
| KR | 101659042 B1 | 9/2016 | |

* cited by examiner

ROLLER SUSPENSION SYSTEM

TECHNICAL FIELD

The disclosure relates to tracked vehicles.

BACKGROUND

Many off-road vehicles, such as earthmoving vehicles (e.g., excavators, skid steer track loaders or multi-terrain track loaders) and agricultural vehicles, include an endless track and a plurality of rollers configured to engage with the endless track. An endless track may help provide traction on surfaces that traditional wheels having a circular cross-section may not be able to adequately grip. For example, a vehicle with an endless track may bridge a greater surface area than a vehicle with two or more circular wheels, which may help the vehicle with the endless track traverse surfaces that the vehicle with circular wheels would not ordinarily be able to traverse, such as uneven or loose surfaces (e.g., gravel or mud).

SUMMARY

The present disclosure describes example roller suspension systems for a roller track system of a tracked vehicle, as well as example tracked vehicles including roller suspension systems. In some examples, a plurality of coil springs is disposed along each axle of each track roller of a tracked vehicle. The plurality of coil springs is configured to reduce an impact force transferred from the track roller to a frame of the tracked vehicle.

In some examples, the disclosure describes a suspension system for a tracked vehicle including a plurality of track rollers configured to contact and roll relative to an inner surface of an endless track, each track roller including a plurality of coil springs disposed between a roller mounting bracket and a frame mounting bracket. The plurality of coil springs is configured to reduce an impact force transferred from the track roller to the frame of the tracked vehicle.

Clause 1: A suspension system for a tracked vehicle, the suspension system comprising a track roller configured to contact and roll relative to an inner surface of a track, wherein the track roller comprises: an axle member; a roller mounting bracket mechanically connected to the axle member; a frame mounting bracket configured to attach to a frame of the tracked vehicle; and a plurality of coil springs disposed between the roller mounting bracket and the frame mounting bracket, wherein the plurality of coil springs is configured to reduce an impact force transferred from the track roller to the frame of the tracked vehicle.

Clause 2: In some examples of clause 1, the plurality of coil springs consists of between three and nine coil springs.

Clause 3: In some examples of clause 1 or clause 2, the plurality of coils springs has only six coil springs.

Clause 4: In some examples of any of clauses 1-3, the suspension system further comprises at least one mounting bar configured to be disposed between the frame mounting bracket and the frame of the tracked vehicle when the frame mounting bracket is attached to the frame of the tracked vehicle.

Clause 5: In some examples of any of clauses 1-4, the suspension system further comprises a plurality of pegs, wherein each coil spring of the plurality of coil springs is disposed around a respective peg of the plurality of pegs.

Clause 6: In some examples of any of clauses 1-5, the suspension system further comprises a plurality of track rollers configured to be distributed along a longitudinal direction of the track.

Clause 7: In some examples of any of clauses 1-6, the coil springs of the plurality of coil springs have a substantially same spring constant.

Clause 8: In some examples of any of clauses 1-6, at least two coil springs of the plurality of coil springs have different spring constants.

Clause 9: In some examples of any of clauses 1-8, each coil spring has a height between 2 centimeters and 10 centimeters.

Clause 10: In some examples of any of clauses 1-9, the suspension system further comprises a plurality of track rollers, the plurality including the track roller, wherein each track roller of the plurality of track rollers comprises: a respective axle member; a respective roller mounting bracket mechanically connected to the respective axle member; a respective frame mounting bracket configured to attach to the frame of the tracked vehicle; and a respective plurality of coil springs disposed between the respective roller mounting bracket and the respective frame mounting bracket, wherein the plurality of coil springs is configured to reduce an impact force transferred from the respective track roller to the frame of the tracked vehicle.

Clause 11: In some examples of any of clauses 1-10, the track roller comprises a first track roller and the plurality of coil springs comprises a first plurality of coil springs, the suspension system further comprises a second track roller comprising a second plurality of coil springs, wherein the first plurality of coil springs has a different spring constant than the second plurality of coil springs.

Clause 12: In some examples of any of clauses 1-11, the axle member defines an axis and the track roller further comprises at least three flange members extending from the axle member substantially perpendicularly to the axis, a first portion of the axle member is disposed between a first pair of adjacent flange members of the at least three flange members, a second portion of the axle member is disposed between a second pair of adjacent flange members of the at least three flange members, each of at least two of the at least three flange members are configured to contact the track when the track is mounted on the suspension system including the track roller, and the first and second portions are configured to contact the track when the track is mounted on the vehicle suspension system.

Clause 13: In some examples of any of clauses 1-12, the frame mounting bracket has a U-shaped cross-sectional area.

Clause 14: In some examples of any of clauses 1-13, the suspension system further comprises two sets of track rollers, wherein each set of track rollers is disposed on an opposite lateral side of the tracked vehicle.

Clause 15: In some examples of any of clauses 1-14, each set of track rollers comprises six track rollers.

Clause 16: In some examples of any of clauses 1-15, a top end of each coil spring of the plurality of coil springs is removably disposed within the frame mounting bracket.

Clause 17: A tracked vehicle comprising a vehicle body; and at least two sets of track rollers, wherein each set of track rollers is disposed on an opposite lateral side of the tracked vehicle, each set of track rollers comprising: a plurality of track rollers, wherein each track roller of the plurality of track rollers is configured to contact and roll relative to an inner surface of a track, and wherein each track roller of the plurality of track rollers comprises: an axle member; a roller mounting bracket mechanically connected to the axle member; a frame mounting bracket configured to attach to the body; and a plurality of coil springs disposed between the roller mounting bracket and the frame mounting bracket, wherein the plurality of coil springs is configured to reduce an impact force transferred from the track roller to the body.

Clause 18: In some examples of clause 17, the vehicle further comprises at least one mounting bar disposed between the plurality of frame mounting brackets and the vehicle body.

Clause 19: In some examples of clause 17 or clause 18, each track roller further comprises a plurality of pegs, wherein each spring of the plurality of coil springs is disposed around a respective peg of the plurality of pegs.

Clause 20: In some examples of any of clauses 17-19, the frame mounting bracket has a U-shaped cross-sectional area.

Clause 21: In some examples of any of clauses 17-20, a top end of each coil spring of the plurality of coil springs is removably disposed within an interior space defined by the U-shaped cross-section of the respective frame mounting bracket.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
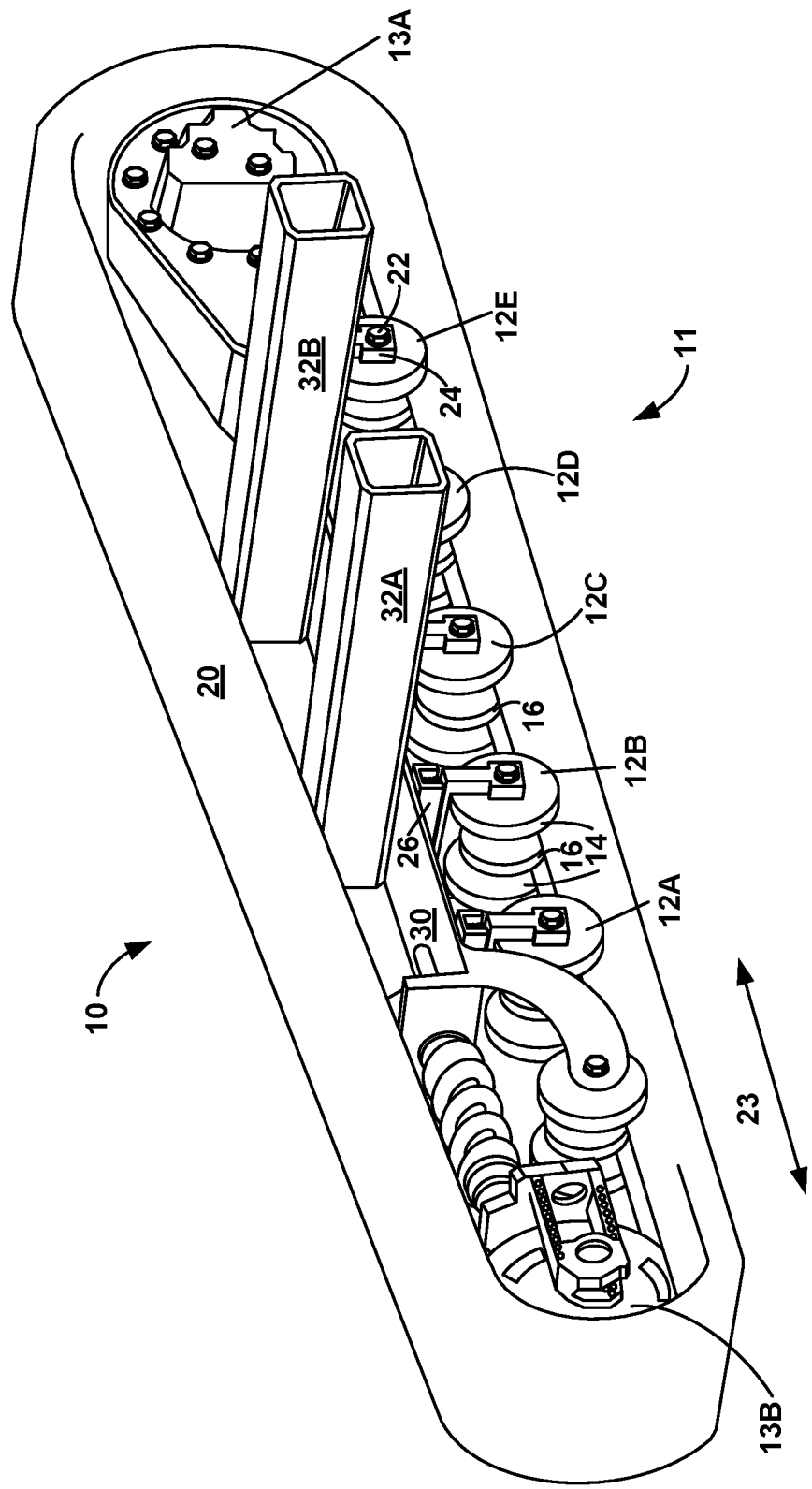
FIG. 1 is a perspective view of an example roller track system of a vehicle, the roller track system including an example roller suspension system.

FIG. 1 is a perspective view of an example roller track system 10 of a vehicle, such as an earthmoving vehicle, construction vehicle, agricultural vehicle, military vehicle, a machine, or the like. In some examples, the vehicle includes a single roller track system 10. In other examples, a vehicle may include a plurality of roller track systems 10, e.g., one on each lateral side of the vehicle. Roller track system 10 includes vehicle track 10 and a roller suspension system 11 configured to reduce an impact force transferred from vehicle track 20 to the frame or undercarriage of the vehicle (also referred to herein as a "tracked vehicle").

Vehicle track 20 is configured to enable a vehicle to travel over an uneven or low-traction surface. Vehicle track 20 is illustrated in FIG. 1 as including endless track 20 (also commonly referred to as a "continuous track" or "caterpillar track"), which defines a longitudinal axis and a lateral axis perpendicular to the longitudinal axis. In some examples, the longitudinal axis is parallel to a direction 23 of movement of vehicle track 20 when driven by a drive system of the vehicle. Endless track 20 may help provide traction on surfaces that traditional wheels having a circular cross-section may not alone be able to adequately grip. For example, a vehicle with an endless track may bridge a greater surface area than a vehicle with two or more circular wheels, which may help the vehicle with the endless track traverse surfaces that the vehicle with circular wheels would not ordinarily be able to traverse, such as uneven or loose surfaces (e.g., gravel or mud). In some examples, endless track 20 may be formed of metal, rubber, such as a molded rubber, or a combination of metal and rubber. Endless track 20 may be molded as a single, integral piece or may be an assembly of interconnected parts that are coupled together to define an endless track.

Roller track system 10 includes a roller suspension system 11 configured to reduce an impact force transferred from endless track 20 to frame 34 (shown in FIG. 2) of the tracked vehicle. As described in further detail below, roller suspension system 11 includes a plurality of coil springs 18 (shown in FIGS. 2-6) disposed between a plurality of track rollers 12A-12E (collectively, track rollers 12 or generally individually referred to as track roller 12) and vehicle frame 34. The coil springs 18 are configured to help store energy from movement of the vehicle and track 20 relative to each other, which may help dampen the forces transferred to frame vehicle 34 and reduce an impact of force transferred from endless track 20 to vehicle frame 34. Vehicle frame 34 may have any suitable configuration and is only conceptually shown in FIG. 2.

Endless track 20 defines an interior surface configured to engage with a plurality of track rollers 12 when track 20 is mounted on roller suspension system 11, and an exterior surface configured to contact the surface on which the vehicle is traversing when track 20 is mounted on roller suspension system 11. Each track roller of track rollers 12 may be configured to contact and roll along the interior surface of endless track 20 when track 20 is mounted on roller suspension system 11 and driven by a drive system, which may engage with track 20 using any suitable technique, such as via drive sprocket wheels 13A, 13B shown in FIG. 1. In some examples, track rollers 12 may be made of metal or any other durable material.

Drive sprocket wheels 13A, 13B may be, for example, a part of a drive system of the vehicle and can be actuated by a drive motor, engage with endless track 20, and rotate endless track 20 as drive sprocket wheels 13A, 13B rotate. In other examples, other drive mechanisms may be used to drive endless track 20. As endless track 20 rotates, rollers 12 may roll with respect to endless track 20. Rollers 12 may help to distribute weight of the vehicle onto endless track 20, may help align endless track 20 with the vehicle and with drive sprocket wheels 13A, 13B, or any combination thereof.

An example roller 12 that may be used with roller track system 10 is described in commonly assigned U.S. Patent Application Publication No. 2017/0361884 by SRJ, Inc., and naming inventor Woo Young Jee. The entire content of U.S. Patent Application Publication No. 2017/0361884 is incorporated herein by reference. In some examples, each track roller of track rollers 12 includes one or more flanges, or circular discs, sharing a common axle 22. For example, each track roller 12 may include two co-axial outer flanges 14 and an inner flange 16 disposed between the two outer flanges 14. In some examples, endless track 20 may define one or more grooves extending longitudinally along its interior surface. The grooves may at least partially engage with flanges 14 and 16 of track rollers 12 when track rollers 12 are mounted within endless track 20. For example, inner flange 16 may partially fit within a groove along the interior surface of endless track 20, enabling track roller 12 to roll forward and/or backward along the longitudinal axis of endless track 20, but otherwise preventing track roller 12 from moving laterally or perpendicularly to the longitudinal axis.

In some examples, roller track system 10 may be configured to attach to frame 24 of a body of a vehicle or machine, thereby suspending the vehicle or machine above the ground and enabling the machine's mobility over relatively rough terrain. For example, roller track system 10 may include one or more load bars 32A, 32B (collectively, load bars 32) extending generally transverse (e.g., perpendicular) to the longitudinal axis of endless track 20. A vehicle (not depicted in FIG. 1) may be secured to load bars 32, e.g., to a top of load bars 32. In some examples, roller track system 10 may also include load panel 30 disposed between load bars 32 and track rollers 12. Load panel 30 may include a substantially flat surface to help evenly distribute the weight of the machine or vehicle among the plurality of track rollers 12. In some examples, load panel 30 and load bars 32 may be made of metal, a polymer, a carbon fiber, or any other durable material or combination thereof.

Figure 2:
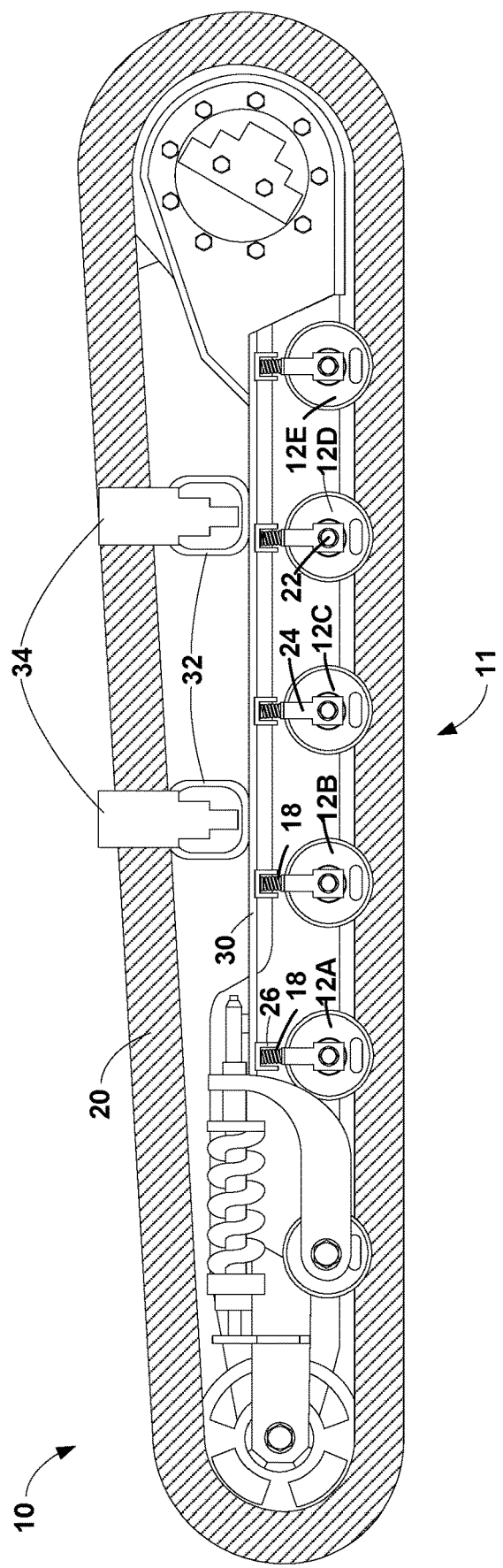
FIG. 2 is a side view of an example roller track system of a vehicle including an example roller suspension system.

FIG. 2 is a side view of roller track system 10 including roller suspension system 11, which is configured to reduce an impact force transferred from the track rollers 12 to a frame 34 of a body of the tracked vehicle. As discussed above, roller suspension system 11 may include a plurality of coil springs 18 disposed between each track roller 12A-12E and frame 34. That is, for each track roller 12, a plurality of coils springs 18 is positioned between the respective track roller 12 and frame 34. In the example shown in FIG. 2, for a given track roller 12, a plurality of coil springs 18 is disposed between a roller mounting bracket 24 (attached to an axle 22 of the respective track roller 12) and a frame mounting bracket 26, mechanically connected to frame 34 of the vehicle (e.g., attached to an undercarriage of frame 34, which is the side of frame 34 closest to rollers 12). Coil springs 18 may function as shock-absorbers, reducing the amount of vertical motion, generated by endless track 20 traversing over an uneven ground surface, that is transferred to the undercarriage 34 of the vehicle, as well as any occupants inside the vehicle.

Figure 3:
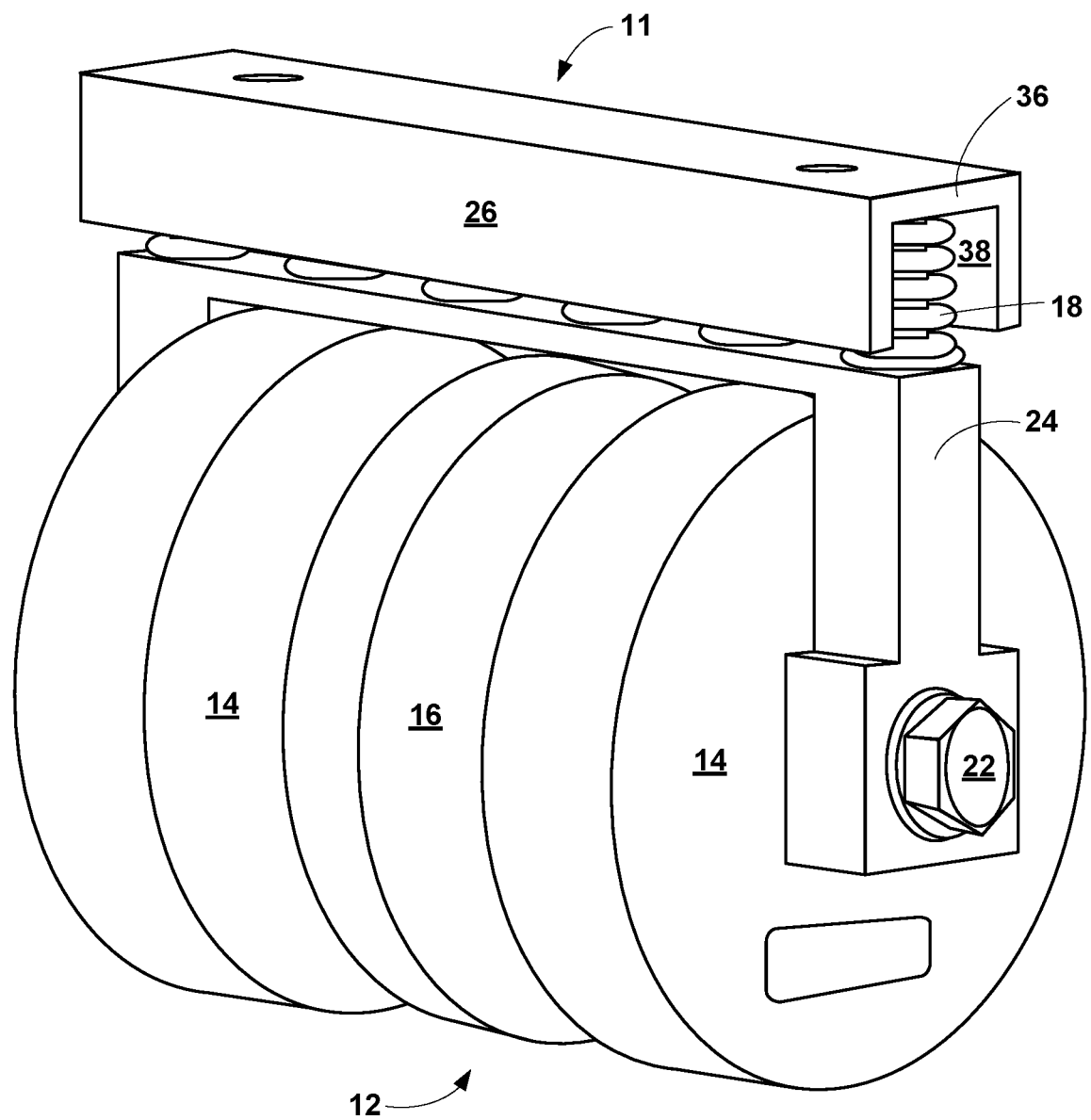
FIG. 3 is a perspective view of the roller suspension system of FIG. 2.
Figure 4:
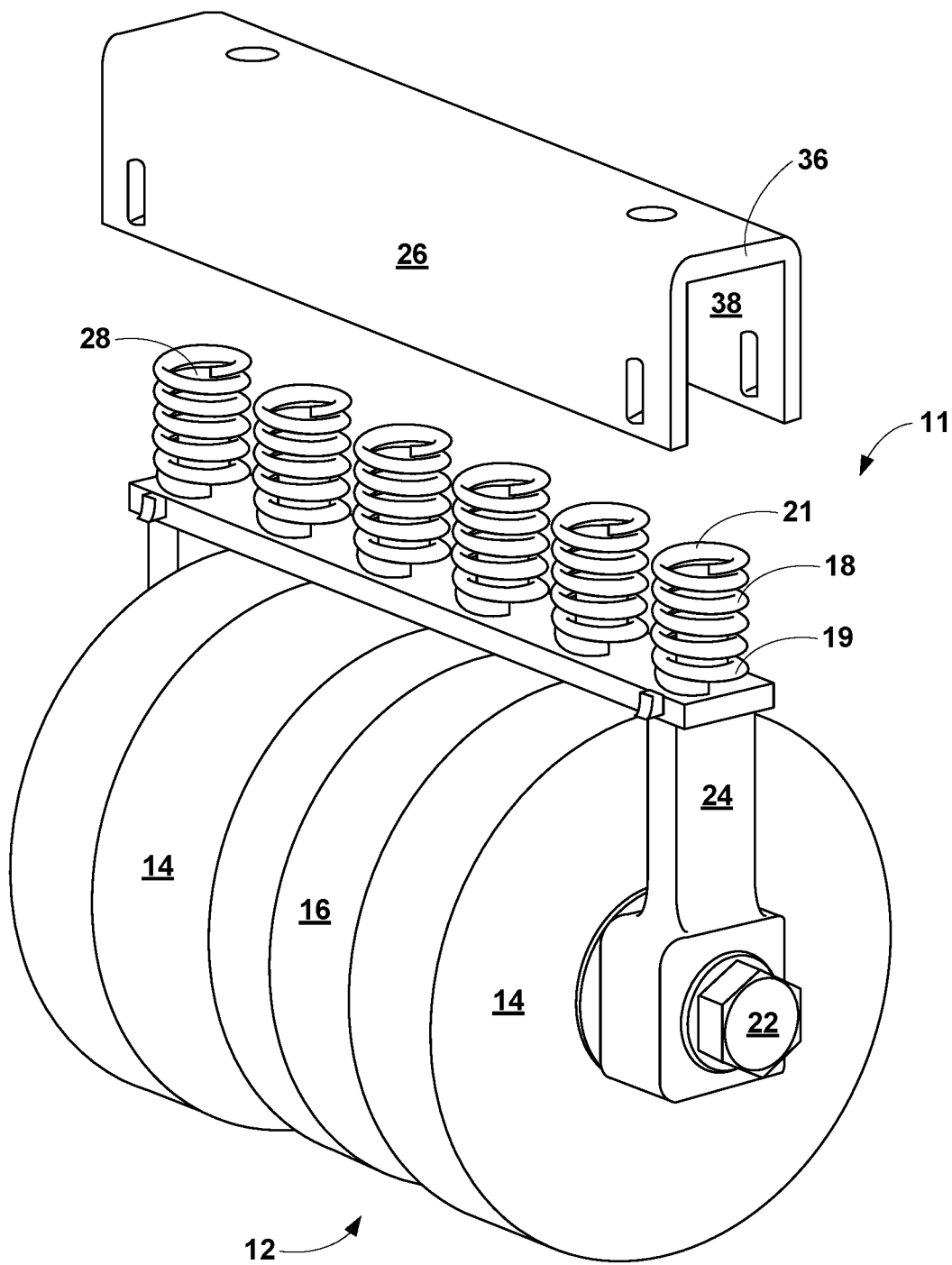
FIG. 4 is an exploded view of a roller suspension system.
Figure 5:
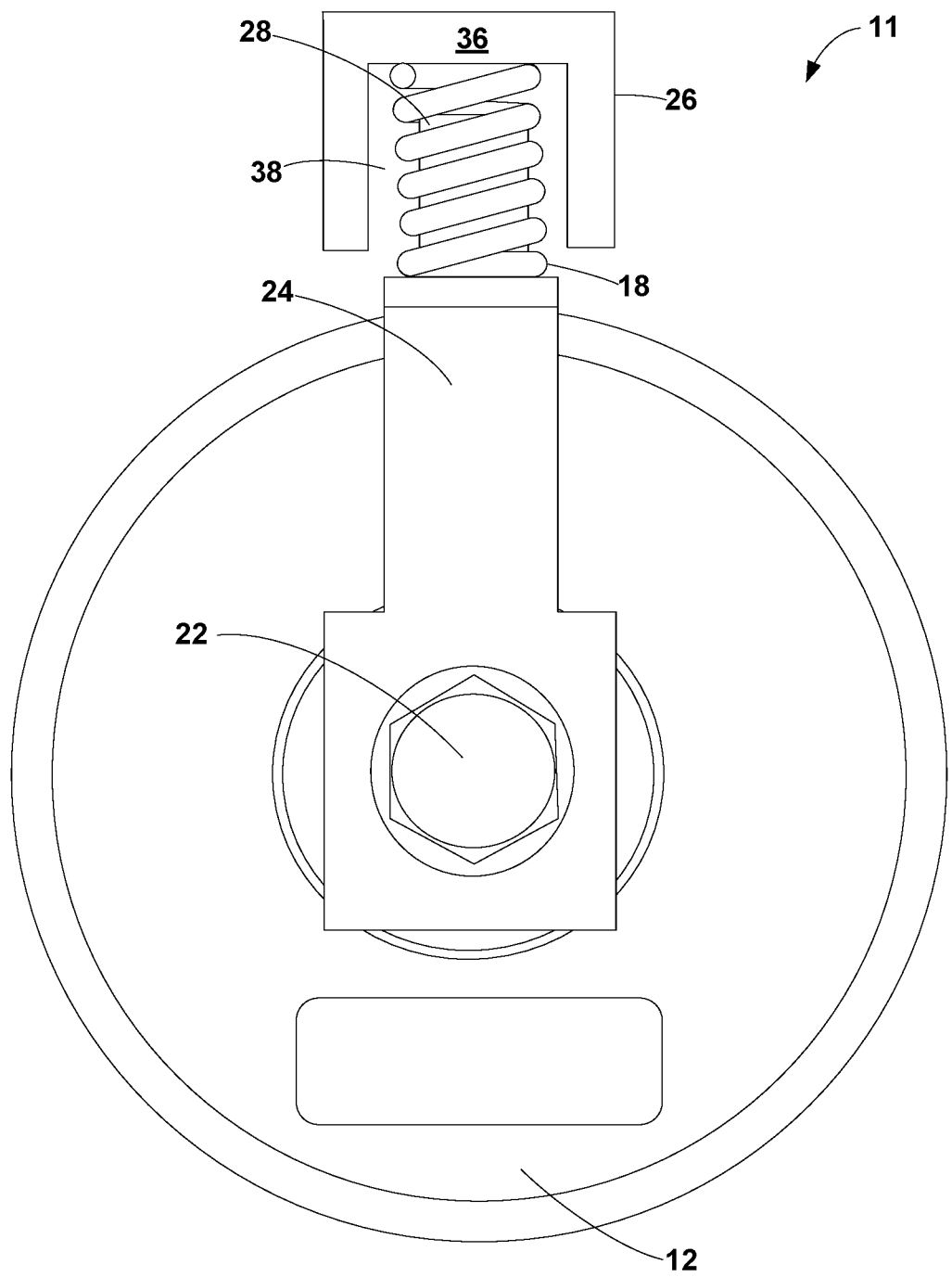
FIG. 5 is a side view of an example roller suspension system.

FIG. 3 is a perspective view of a part of roller suspension system 11 of roller track system 10 depicted in FIG. 2 and illustrates a track roller 12 (e.g., track roller 12A, 12B, 12C, 12D, or 12E) and a respective set of coil springs 18. FIG. 4 is an exploded view of the portion of roller suspension system 11 shown in FIG. 3, and FIG. 5 is a side view of the portion of roller suspension system 11 shown in FIG. 3

As discussed above with respect to FIG. 1, track roller 12 is configured to roll relative to the interior surface of endless track 20. For example, as endless track 20 is driven by a drive system, endless track roller 12 may roll along track 20, which alone or together with other track rollers 12 of system 10 may help keep endless track 12 in place relative to a vehicle with which roller track system 10 is used. Track roller 12 may include one or more structures defining a circular cross-section, where the structures share a common axle 22. In the example depicted in FIG. 3, the structure of track roller 12 defines one inner flange 16 disposed in between two outer flanges 14. In some examples, all flanges of roller 12 may be of equivalent size to one another. In other examples, inner flange 16 may be smaller than outer flanges 14 in width and/or diameter. Each outer flange 14 may be rigidly connected to inner flange 16, such that all three flanges of roller 12 rotate simultaneously around shared axle 22.

In some examples, roller suspension system 11 includes roller mounting bracket 24, configured to mechanically connect track roller 12 to frame 34 of a vehicle while still permitting track roller 12 to rotate around an axis of rotation (e.g., aligned with axle 22) relative to frame 34. For example, roller mounting bracket 24 may be rigidly connected externally to either or both ends of axle 22, so as to mechanically connect track roller 12 to frame 34 without impeding the rotational motion of roller 12 about axle 22. In some examples, roller mounting bracket 24 may include a substantially flat upper surface (the surface closest to frame 34 when roller suspension system 11 is attached to frame 34). In some examples, roller mounting bracket 24 may be made of metal, a polymer, a carbon fiber, or any other substantially durable material or combination thereof.

In some examples, roller suspension system 11 includes frame mounting bracket 26, configured to mechanically connect roller mounting bracket 24 to frame 34 of the vehicle. For example, frame mounting bracket 26 may be rigidly connected, either directly or indirectly, to frame 34 (e.g., to an undercarriage of frame 34). In some examples, frame mounting bracket 26 may include a substantially U-shaped or horseshoe-shaped cross-sectional shape (as shown alongside surface 36 in FIG. 3), having a top portion configured to rigidly connect to frame 34, and two side portions. Together, the top portion and two side portions of bracket 26 define internal cavity 38. The top portion of frame mounting bracket 26 may indirectly rigidly connect to frame 34 of the vehicle via other mechanical components (such as, but not limited to, load panel 26 and/or mounting bars 32, shown in FIGS. 1 and 2). In some examples, frame mounting bracket 26 may be made of metal, a polymer, a carbon fiber, or any other substantially durable material or combination thereof.

In some cases, frame 34 (FIG. 2) of a vehicle, such as a skid steer track loader, which may be moving fast while being operated, may receive mechanical stress from an uneven or rough ground surface. The high-stress load or force may transfer through one of track rollers 12 up into the vehicle frame, potentially applying high stresses to the vehicle and/or causing discomfort to an occupant of the vehicle. In some examples in accordance with this disclosure, a roller suspension system 11 includes a plurality of coil springs 18 disposed between a particular track roller 12 and frame 34 of a machine or vehicle, in order to reduce an impact force transferred from the track roller 12 to the vehicle and its occupants.

In the example shown in FIG. 3, plurality of coil springs 18 is positioned between a roller mounting bracket 24 and a respective frame mounting bracket 26. Each coil spring 18, which may also be referred to as a helical spring in some examples, is a mechanical device that is configured store mechanical energy and subsequently release the mechanical energy, e.g., to absorb shock. Each coil spring 18 may include a cylindrical coil of metal or another suitable material. In some examples, each coil spring 18 has a circular bottom end 18 and a circular top end 19 (depicted in FIG. 4). In some examples, circular bottom end 18 of each coil spring 18 may be connected, such as by welding, by an adhesive, by a bolt, or otherwise rigidly connected, to a substantially flat upper surface of roller mounting bracket 24. In some examples, circular top end 19 of each coil spring 18 may be disposed within internal cavity 38 of frame mounting bracket 26. In some examples, circular top end 19 of each coil spring 18 may physically contact the interior surface of the top portion of frame mounting bracket 26, although coil spring 18 and frame mounting bracket 26 need not be rigidly connected to one another. Examples in which the tops of coil springs 18 are not rigidly connected to a respective frame mounting bracket 26 may facilitate assembly and disassembly of the suspension system 11, e.g., for maintenance or replacement. In addition, because suspension system 11 may be connected to vehicle frame 34 (or another part of a vehicle) in some examples without more permanently attaching coil springs 18 to frame mounting bracket 26, track rollers 12 and the plurality of coils springs 18 may be more easily retrofit onto an existing vehicle compared to a vehicle suspension system that requires a more permanent (e.g., welding) attachment to frame 34, e.g. via frame mounting brackets 26.

In some examples, each coil spring 18 may include an inherent spring constant, defined as the amount of applied force required to compress or expand the respective coil spring 18 by a given amount. The spring constant of a particular coil spring 18 may also define a maximum load for the spring 18, i.e., the minimum amount of force required to fully compress spring 18, such that the individual rings of the coil are in physical contact with each other, and the spring 18 may not be compressed any further. When spring 18 is fully compressed, it may no longer function to absorb or reduce shock or force transferred to vehicle frame 34. Therefore, several variables may be selected such that the maximum weight of the vehicle is less than the combined maximum loads of all of the coil springs 18 of roller suspension system 10. These variables include the individual spring constants of coil springs 18, the number of coil springs 18 per track roller 12, and the number of track rollers 12 per side of the vehicle. (The maximum load of coil spring 18) times (the number of springs per track roller 12) times (the number of rollers per side of the machine) times (two sides of the machine) should be greater than the maximum vehicle weight. For example, for each coil spring having 135 pounds (lbs.) maximum load capacity×6 springs per roller×6 rollers per side×2 sides equals 9,720 lbs. maximum load. In this example, the roller suspension system will support and absorb shock from a machine having a maximum weight of 9,720 lbs. or less.

As shown in FIGS. 4 and 5, in some examples, each coil spring 18 is disposed around, but not rigidly connected to, a respective peg 28. Peg 28 may be rigidly connected to roller mounting bracket 24, and configured to hold a respective coil spring in place. For example, peg 28 is configured to enable vertical compression and expansion of the coil spring 18 surrounding peg 28, but otherwise inhibit spring 18 from moving with respect to roller mounting bracket 24 and/or frame mounting bracket 26. In some examples, peg 28 is separate from and mechanically connected to mounting bracket 24 (e.g., by welding). In another example, peg 28 is monolithically formed with mounting bracket 24. Peg may be formed from any suitable material, such as, but not limited to, a metal, a polymer, a carbon fiber material, or any combination thereof.

A plurality of coil springs 18 is disposed between a respective track roller 12 and vehicle frame 34. These coil springs 18 may be referred to as a set of coil springs associated with a particular track roller 12 or a particular roller mounting bracket 24. In the example depicted in FIG. 4, track roller 12 is depicted as having six evenly-spaced coil springs 18, the spacing being measured between a vertical central axis of each spring 18. In other examples, track roller 12 may have a different number of springs 18, such as, but not limited to, between three and nine springs, distributed in the lateral direction of track 20. In some examples, coil springs 18 may not be evenly spaced with respect to one another. For example, a particular track roller 12 may have coil springs that are closer to one another near the middle of the roller, and farther apart near the ends, or vice versa.

In some examples, each coil spring 18 of a set of coil springs has substantially the same spring constant (e.g., the same but for manufacturing variances). In other examples, different coil springs 18 of the same set (and associated with the same track roller 12) may have different spring constants. For example, for a track roller 12 disposed under a portion of a vehicle that extends further below the body of the vehicle than other portions extend, coil springs 18 corresponding to that track roller may be configured to have relatively lower spring constants, so that the coil springs may compress more easily to fit within the reduced available space between roller 12 and the vehicle.

In addition, in some examples, all the coil springs 18 of roller suspension system 11 may have substantially the same spring constant. In examples in which track rollers 12 are equidistant from vehicle frame 34, having substantially same spring constants may help suspension system 11 evenly distribute the weight of the vehicle among the plurality of track rollers 12. In other examples, however, all the coil springs 18 of roller suspension system 11 have different spring constants. For example, all of the coil springs 18 along a particular roller mounting bracket 24 may have a first common spring constant, whereas all of the coil springs 18 along a different roller mounting bracket 24 may have a second common spring constant.

Figure 6:
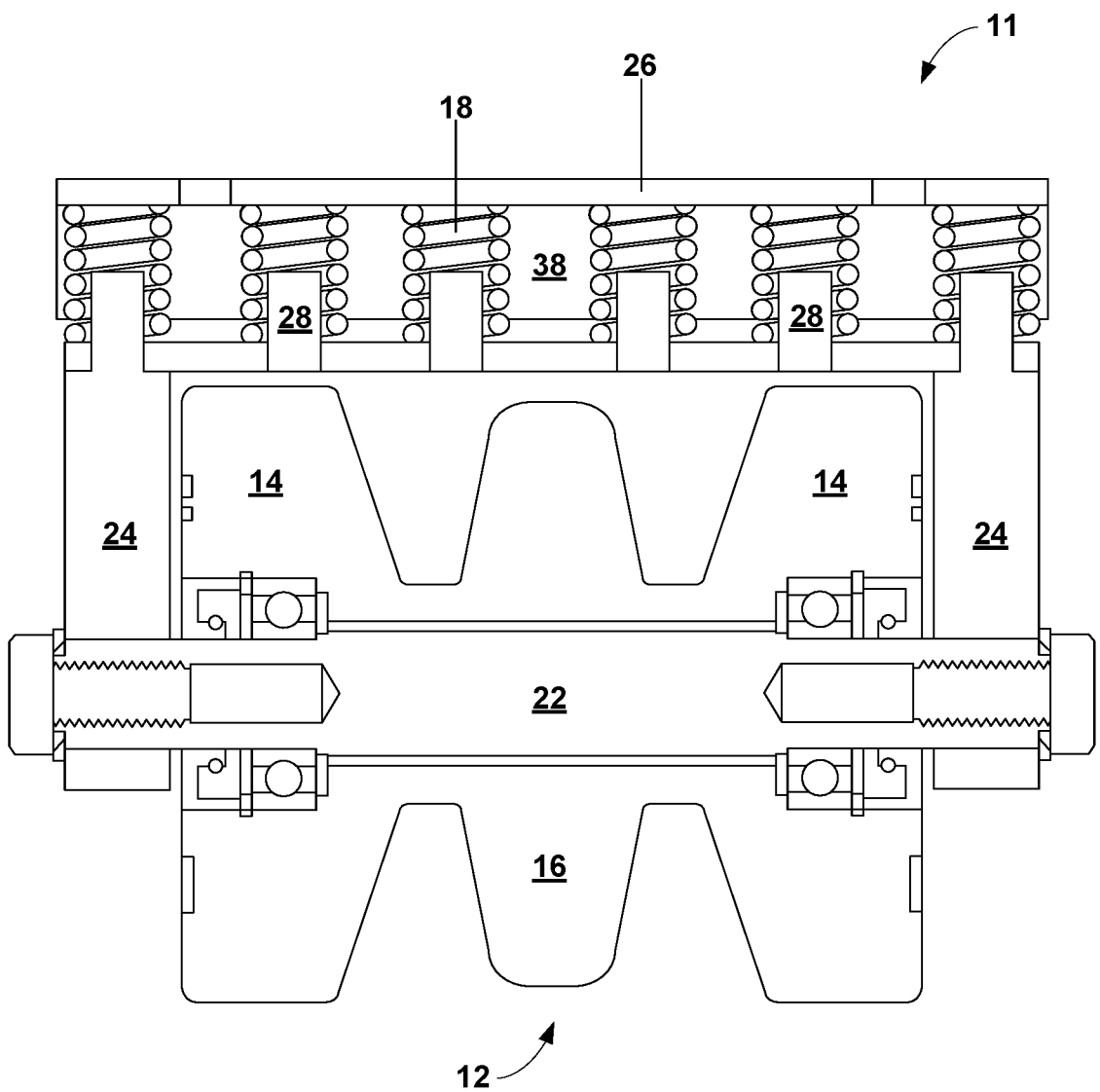
FIG. 6 is a schematic cross-sectional view of an example roller suspension system.

FIG. 6 is a schematic cross-sectional view of an example roller suspension system 11 and illustrates a plurality of coil springs 18 disposed between roller mounting bracket 24 and a respective frame mounting bracket 26. Each coil spring 18 may include a cylindrical coil of metal, having a circular bottom end 19 and a circular top end 21. In some examples, the circular bottom end 19 of each coil spring 18 may be connected, such as rigidly, to a flat upper surface of roller mounting bracket 24. In some examples, the circular top end 21 of each coil spring 18 may be disposed within internal cavity 38 of frame mounting bracket 26. In some examples, every coil spring 18 along a particular roller mounting bracket 24 may have a common height, such as between 2 centimeters and 10 centimeters, e.g., about 2 centimeters to about 5 centimeters, such as about 2.5 centimeters. And in other examples, every coil spring 18 of roller suspension system 11 may have a common height, such as between two and five centimeters.

In some examples, the circular top end 21 of each coil spring 18 may physically contact the interior surface of the top portion of frame mounting bracket 26, although the two components need not be rigidly connected to one another.

Various examples have been described. These and other examples are within the scope of the following claims.

What is claimed is:

1. A suspension system for a tracked vehicle, the suspension system comprising:
   a track roller configured to contact and roll relative to an inner surface of a track and in a direction parallel to a longitudinal direction of the track, wherein the track roller comprises:
   an axle member;
   a roller mounting bracket mechanically connected to the axle member;
   a frame mounting bracket configured to attach to a frame of the tracked vehicle; and
   a plurality of coil springs disposed between the roller mounting bracket and the frame mounting bracket, wherein the coil springs of the plurality are distributed in a direction transverse to the longitudinal direction of the track, and wherein the plurality of coil springs is configured to reduce an impact force transferred from the track roller to the frame of the tracked vehicle.

2. The suspension system of claim 1, wherein the plurality of coil springs consists of between three and nine coil springs.

3. The suspension system of claim 1, wherein the plurality of coils springs has only six coil springs.

4. The suspension system of claim 1, further comprising at least one mounting bar configured to be disposed between the frame mounting bracket and the frame of the tracked vehicle when the frame mounting bracket is attached to the frame of the tracked vehicle.

5. The suspension system of claim 1, further comprising a plurality of pegs, wherein each coil spring of the plurality of coil springs is disposed around a respective peg of the plurality of pegs.

6. The suspension system of claim 1, further comprising a plurality of track rollers including the track roller, the plurality configured to be distributed along the longitudinal direction of the track.

7. The suspension system of claim 1, wherein the coil springs of the plurality of coil springs have a substantially same spring constant.

8. The suspension system of claim 1, wherein at least two coil springs of the plurality of coil springs have different spring constants.

9. The suspension system of claim 1, wherein each coil spring has a height between 2 centimeters and 10 centimeters.

10. The suspension system of claim 1, further comprising a plurality of track rollers, the plurality including the track roller, wherein each track roller of the plurality of track rollers comprises:
   a respective axle member;
   a respective roller mounting bracket mechanically connected to the respective axle member;
   a respective frame mounting bracket configured to attach to the frame of the tracked vehicle; and
   a respective plurality of coil springs disposed between the respective roller mounting bracket and the respective frame mounting bracket, wherein the coil springs of the plurality are distributed in a direction transverse to the longitudinal direction of the track, and wherein the plurality of coil springs is configured to reduce an impact force transferred from the respective track roller to the frame of the tracked vehicle.

11. The suspension system of claim 1, wherein the track roller comprises a first track roller and the plurality of coil springs comprises a first plurality of coil springs, the suspension system further comprising a second track roller comprising a second plurality of coil springs, wherein the first plurality of coil springs has a different spring constant than the second plurality of coil springs.

12. The suspension system of claim 1, wherein the axle member defines an axis and the track roller further comprises at least three flange members extending from the axle member substantially perpendicularly to the axis, wherein a first portion of the axle member is disposed between a first pair of adjacent flange members of the at least three flange members, wherein a second portion of the axle member is disposed between a second pair of adjacent flange members of the at least three flange members, wherein each of at least two of the at least three flange members are configured to contact the track when the track is mounted on the suspension system including the track roller, and wherein the first and second portions are configured to contact the track when the track is mounted on the vehicle suspension system.

13. The suspension system of claim 1, wherein the frame mounting bracket has a U-shaped cross-sectional area.

14. The suspension system of claim 1, further comprising two sets of track rollers, one of the sets including the track roller, wherein each set of track rollers is disposed on an opposite lateral side of the tracked vehicle.

15. The suspension system of claim 1, wherein a top end of each coil spring of the plurality of coil springs is removably disposed within the frame mounting bracket.

16. A tracked vehicle comprising:
   a vehicle body; and
   at least two sets of track rollers, wherein each set of track rollers is disposed on an opposite lateral side of the tracked vehicle, each set of track rollers comprising:
      a plurality of track rollers, wherein each track roller of the plurality of track rollers is configured to contact and roll relative to an inner surface of a track and in a direction parallel to a longitudinal direction of the track, and wherein each track roller of the plurality of track rollers comprises:
         an axle member;
         a roller mounting bracket mechanically connected to the axle member;
         a frame mounting bracket configured to attach to the body; and
         a plurality of coil springs disposed between the roller mounting bracket and the frame mounting bracket, wherein the coil springs of the plurality are distributed in a direction transverse to the longitudinal direction of the track, and wherein the plurality of coil springs is configured to reduce an impact force transferred from the track roller to the body.

17. The vehicle of claim 16, further comprising at least one mounting bar disposed between the plurality of frame mounting brackets and the vehicle body.

18. The vehicle of claim 16, each track roller further comprising a plurality of pegs, wherein each spring of the plurality of coil springs is disposed around a respective peg of the plurality of pegs.

19. The vehicle of claim 16, wherein the frame mounting bracket has a U-shaped cross-sectional area.

20. The vehicle of claim 19, wherein a top end of each coil spring of the plurality of coil springs is removably disposed within an interior space defined by the U-shaped cross-section of the respective frame mounting bracket.

* * * * *